(12) United States Patent  
Peffer et al.

(10) Patent No.: US 7,370,971 B2  
(45) Date of Patent: May 13, 2008

(54) WALL MOUNTED KALEIDOSCOPE

(76) Inventors: Patricia L. Peffer, 19 Shadblow La., Hendersonville, NC (US) 28791; George B. Waites, 2124 Hendersonville Rd., Suite 100, Arden, NC (US) 28704

( * ) Notice: Subject to any disclaimer, the term of this patent is extended or adjusted under 35 U.S.C. 154(b) by 185 days.

(21) Appl. No.: 11/321,930

(22) Filed: Dec. 28, 2005

(65) Prior Publication Data

US 2006/0164728 A1    Jul. 27, 2006

Related U.S. Application Data

(60) Provisional application No. 60/642,034, filed on Jan. 3, 2005.

(51) Int. Cl.  
*G03B 21/00* (2006.01)  
*G02B 27/08* (2006.01)
(52) U.S. Cl. .............................. 353/1; 353/1; 359/616; 359/617; D21/403
(58) Field of Classification Search ................... 353/1, 353/2; 359/616; D21/403  
See application file for complete search history.

(56) References Cited

U.S. PATENT DOCUMENTS

| | | | |
|---|---|---|---|
| 1,196,081 A | | 8/1916 | Carence |
| 1,547,817 A | * | 7/1925 | Mahoney ................ 359/616 |
| 1,914,562 A | * | 3/1933 | Freeland .................... 353/2 |
| 4,077,706 A | | 3/1978 | Yaeger |
| 4,262,441 A | | 4/1981 | Wolf |
| 4,536,064 A | | 8/1985 | Schindel et al. |
| 4,815,801 A | | 3/1989 | Anderson |
| 4,964,711 A | | 10/1990 | Degnan |
| 5,094,525 A | | 3/1992 | Nelson, Jr. et al. |
| 5,146,364 A | | 9/1992 | Oku |
| 5,161,055 A | | 11/1992 | Blechschmidt |
| 5,184,249 A | | 2/1993 | Dickman |
| 6,644,819 B2 | | 11/2003 | Nelson |

* cited by examiner

*Primary Examiner*—Rochelle Blackman  
(74) *Attorney, Agent, or Firm*—J. Bennett Mullinax, LLC

(57) ABSTRACT

A wall mounted kaleidoscope is suitable for mounting within an opening passing through a wall, ceiling or other building structure to provide a visually attractive kaleidoscope display to a viewer within the building interior. A kaleidoscope housing extends through the wall opening and is mountable to the wall. A kaleidoscope mirror structure is mounted within the housing and includes three generally triangular mirrors arranged in the shape of a triangulated pyramid, with its base facing the viewer. A rotatable drum associated with the mirror holds loose articles for generating a kaleidoscope display; the drum may be rotated by an electric motor or manually. The light source may consist of artificial illumination and/or a light-transmitting cover which protects the structure from the elements.

7 Claims, 2 Drawing Sheets

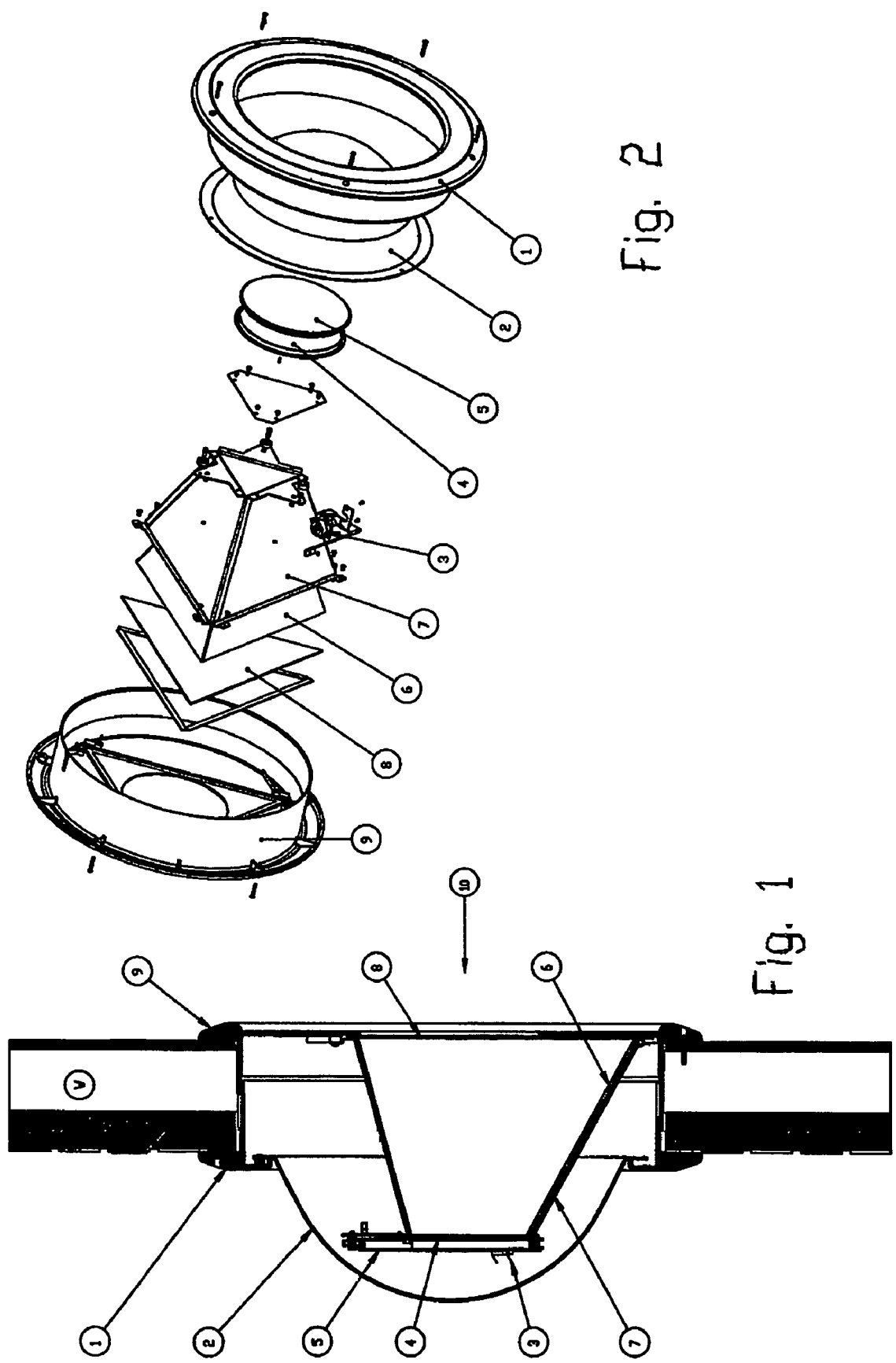

WALL MOUNTED KALEIDOSCOPE

FIELD OF THE INVENTION AND RELATED APPLICATION

This application claims the benefit of U.S. provisional application No. 60/642,034 filed Jan. 3, 2005.

The invention relates to a kaleidoscope device for mounting within a wall or door, for providing a decorative display within the interior of a structure such as a house or building.

BACKGROUND OF THE INVENTION

Kaleidoscopes are well known for providing an interesting visual display, by providing multiple moveable reflections of objects. The principle of a kaleidoscope relies on a V-shaped mirror structure, with the inside surfaces being mirrored, a collection drum for holding display elements such as colored glass pieces, and a viewing window or portal for viewing the display. Rotation of the drum or kaleidoscope as a whole causes shifting of the moveable elements within the drum, resulting in endlessly variable and visually interesting displays.

The kaleidoscope may be illuminated, for example as described in U.S. Pat. No. 6,644,819, to Nelson, which describes a triangular tubular structure having three internally mirrored panels, with a light source for illuminating the interior of the tubular structure. Rotation of the kaleidoscope may also be motorized, for example as described in U.S. Pat. No. 5,184,249 to Dickman. It is also known to provide a kaleidoscope that projects the kaleidoscope image, for example onto a wall or screen. One such example is described in U.S. Pat. No. 4,077,706 to Yaeger.

The interesting visual effects provided by a kaleidoscope can provide a decorative and visually interesting feature in a structure.

SUMMARY OF THE INVENTION

The present invention relates to a kaleidoscope for permanent mounting within the wall of a building, residence or other similar structure, to provide a visually interesting illuminated kaleidoscope display visible within the interior of the structure. The device is intended to be mounted within an opening within the wall, although it will be seen that the device may be mounted within other structural components, including ceilings, roofs, doors, etc. The term "wall" herein (including in the claims) refers to any suitable building component. Directional references herein such as "up" and "down" are for convenience of description, since clearly the device may be oriented in any direction. For convenience, the device is described herein in the orientation when mounted within a vertical wall.

In one aspect, the invention comprises a tubular kaleidoscope housing, suitable for mounting within a wall structure or the like and extending entirely through the wall from the interior to the exterior of the wall. Optionally, the exterior exposed end of the structure is covered with a clear or translucent covering to seal the structure against the elements. A kaleidoscope mirror structure is mounted within the housing. Optionally, an illumination source is provided, to provide sufficient illumination for a clear kaleidoscope display. Alternatively, the system may rely on natural lighting from the exterior of the structure. It will be emphasized that although the present system is intended for use in an outside building wall such that the outside portion of the housing is exposed to the outside for natural illumination, the system may readily be installed within an interior wall such that both respective ends of the housing are within the building interior. In either case, the term "exterior" refers to the first side of the housing normally intended for facing the building exterior and which does not receive a kaleidoscope display, and "interior" refers to the end of the structure from which one may view the kaleidoscope display. The interior face of the kaleidoscope housing is optionally covered with a clear plate and the exterior part is covered with a weather tight light transmissible covering, which preferably is domed to accommodate a protruding mirror structure. The kaleidoscope mirror system preferably comprises three mirrors arranged in the shape of a triangular truncated pyramid having an open base and apex and oriented on a horizontal axis such that the side that forms the base of the pyramid is on a vertical plane (when mounted within a vertical wall), with the apex facing the building exterior and the open base facing the building interior to provide viewing of the kaleidoscope display. Loose articles such as pieces of glass are placed within a rotatable collection drum, which is mounted to the kaleidoscope mirror system at the apex end. Rotation of the drum causes movement of the articles within the collection drum, thereby providing an endlessly shifting kaleidoscope display visible to a viewer within the interior of the building. Rotation is optional and the device may comprise a non-rotatable drum.

BRIEF DESCRIPTION OF THE DRAWINGS

These and other advantages of the invention will become apparent upon reading the following detailed description and upon referring to the drawings in which:

FIG. 1 is a schematic diagram of a cross-section of the kaleidoscope mounted within a wall;

FIG. 2 is an exploded view of an embodiment of the invention;

Figure 4:
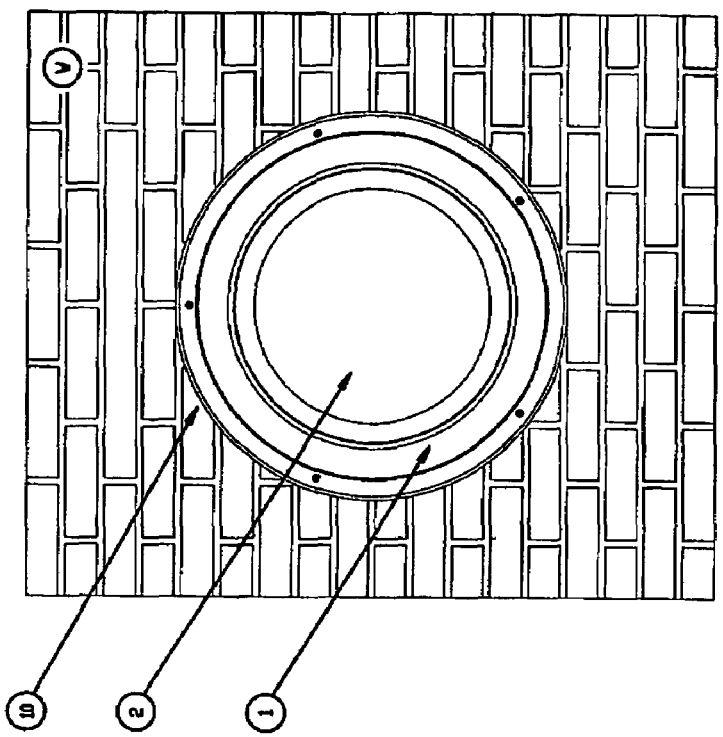
FIG. 4 is a view opposed to FIG. 3, from the exterior.
Figure 3:
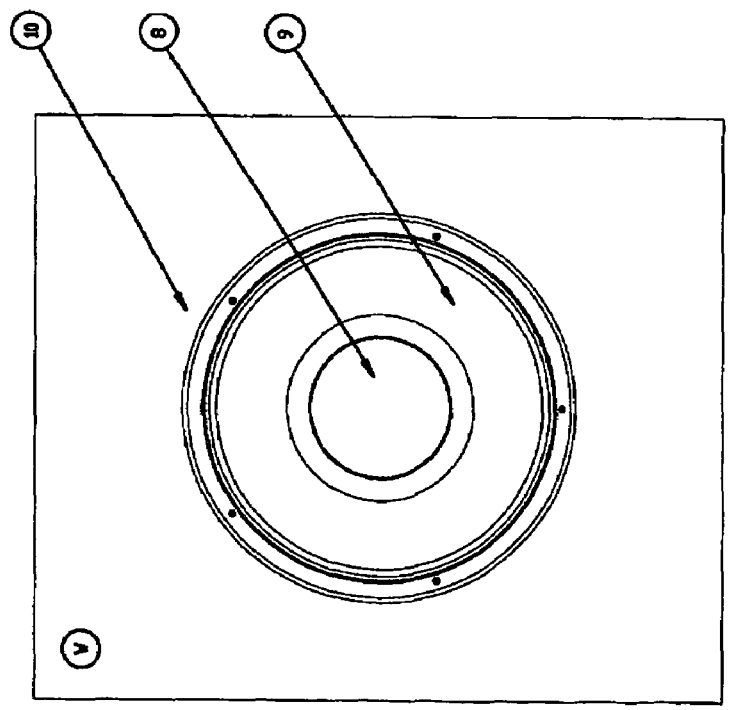
FIG. 3 is a side elevation showing the device mounted in a wall, from the interior.

While the invention will be described in conjunction with the illustrated embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

An embodiment of a kaleidoscope device in accordance with the invention is shown schematically in FIG. 1 at reference numeral 10. This embodiment includes an exterior bezel 1 that extends through a wall "W", exterior dome 2, an electric motor 3 to actuate the collection drum 4, collection lid 5, three mirrors 6 that are held in position by the mirror brackets 7, a viewing window 8 to enable visibility of the collection drum 4, and an interior bezel 9 that extends through the wall "W".

The mirror structure 6 is configured as a truncated 4 sided pyramid, with the base being parallel to the plane of the wall "W". The base is open, but is optionally covered with a transparent window 8, described below. The tapered shape of the mirror structure permits a relatively broad and shallow structure such that the base is relatively large to provide a large viewing area, but the overall depth is relatively shallow to minimize protrusion from the wall "W".

An interior bezel 9 is attached to the interior surface of wall "W" holding the viewing window 8, the three mirrors 6, and the three mirror brackets 7 in place forming a seal against the interior bezel 9. The collection drum 4 and collection lid 5 which hold the display elements (not shown) are mounted to the mirror brackets 7 and extend between the collection drum and the viewing window 8. The collection drum 4 contains a plurality of display elements (not shown) that form visually attractive images or designs, for instance as in a kaleidoscope. The display elements may include shards or forms of predetermined shapes, fabricated from, for instance, coloured glass, plastic or foil.

Rotation means rotates the drum structure 4. While preferably this comprises a small electric motor 3, any suitable motor-driven or manually operable rotation means is within the scope of the invention.

The motor 3 rotates a wheel that rotates the collection drum through a drive system (not shown) such as a gear system, a belt-and-pulley system, or another type of drive system known to those of ordinary skill in the art. Depending on the configuration of the display elements within the collection drum 4, as the collection drum 4 rotates the display elements may change position and form any one of a plurality of designs or images.

A viewer (not shown) may view the collection drum 4 and the display elements therein through the viewing window 8. Natural or artificial light passes through the collection drum 4 in order to illuminate the display elements for viewing through the viewing window 8. Natural light (i.e., sunlight or moonlight; not shown) and/or outdoor artificial light (not shown) may pass through the exterior dome 2 and through the collection drum 4. However, such lights may be unavailable or insufficient to illuminate the display elements in the collection drum 4 to the satisfaction of the viewer. Therefore, an artificial light (not shown) may be provided adjacent to the collection drum 4. The artificial light (not shown) may be switchable by the viewer either by toggle or dimmer switch (not shown) and/or may be photosensitive.

The interior bezel 9 extends between the inside wall "W" and viewing window 8 and attaches to the mirror brackets 7 that holds the three mirrors 6 in position suspended in the interior of the wall. The three mirrors 6 are displayed along the length of the tube created by the interior bezel 9 and the exterior bezel 1 in an equilateral triangle configuration known by those of ordinary skill in the kaleidoscope art.

The exterior dome 2 and the exterior dome 1 of the apparatus 10 will be attached to the exterior wall providing a seal to keep out dust, trash, insects, etc. The exterior dome 2 and the exterior dome 1 may be removed for maintenance if desired. The apparatus 10 may be installed in an exterior or outside wall of any type of structure, including, without limitation, homes, offices, churches, retail stores, special event venues, and conference/meeting facilities. The apparatus 10 may also be provided in an interior wall in conjunction with artificial light.

A method for constructing and using the device, is practiced by providing and assembling a window a described above, peering through the window, and actuating the motor 3 to rotate the collection drum 4 to create desirable images and designs for viewing.

A kaleidoscope device and method is described above. Various details of the invention may be changed without departing from its scope. Furthermore, the foregoing description of the invention and the best mode for practicing the invention are provided for the purpose of illustration only and not the purpose of limitation—the invention being defined by the claims.

Thus, it is apparent that there has been provided in accordance with the invention a WALL MOUNTED KALEIDOSCOPE that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. A kaleidoscopic structure for mounting within an opening in a wall having interior and exterior surfaces, comprising a housing configured for mounting within said opening of a wall having interior and exterior surfaces, a kaleidoscopic mirror structure mounted within said housing having a first end oriented toward said exterior wall surface and a second end oriented toward said interior wall surface; a drum associated with said mirror structure for containing colored articles for generating a decorative kaleidoscopic effect, said drum having first and second light transmittable surfaces facing the exterior and interior surfaces respectively, said mirror structure comprising a truncated three-sided pyramid having an open bottom arranged such that the direction from an apex end of said pyramid to said open bottom is oriented in the same direction as the direction from the exterior surface of the wall to the interior surface of the wall, said drum adjacent to the apex end of said pyramid structure.

2. A structure as defined in claim 1, further comprising rotation means for rotating said drum.

3. A structure as defined in claim 2, wherein said rotation means comprises an electric motor.

4. A structure as defined in claim 1, wherein the exterior side of said housing is covered by a light-transmittable cover sealed to prevent entry of the outside elements within the interior of said housing.

5. A structure as defined in claim 1, wherein the open base of said pyramid mirror structure is covered by a clear panel for viewing.

6. A structure as defined in claim 1, wherein said housing comprises interior and exterior bezels, for mounting to the interior and exterior surfaces of said wall respectively.

7. A structure as defined in claim 1, further comprising an illuminator for providing artificial illumination of said kaleidoscope.

* * * * *